United States Patent
Ohtsuka

(10) Patent No.: US 6,555,084 B2
(45) Date of Patent: Apr. 29, 2003

(54) METHOD OF DECOMPOSING AMMONIA GAS

(75) Inventor: Yasuo Ohtsuka, Sendai (JP)

(73) Assignee: President of Tohoku University, Sendai (JP)

( * ) Notice: Subject to any disclaimer, the term of this patent is extended or adjusted under 35 U.S.C. 154(b) by 108 days.

(21) Appl. No.: 09/802,927

(22) Filed: Mar. 12, 2001

(65) Prior Publication Data

US 2001/0031236 A1 Oct. 18, 2001

(30) Foreign Application Priority Data

Mar. 15, 2000 (JP) .......................... 2000-072196

(51) Int. Cl.$^7$ .............................. C01B 21/02; B01J 23/00
(52) U.S. Cl. ...................... 423/351; 252/374; 502/180; 502/182; 502/183; 502/184; 502/185
(58) Field of Search ................. 423/351; 252/374; 502/180, 182, 183, 184, 185

(56) References Cited

FOREIGN PATENT DOCUMENTS

| JP | 35-8930 | 7/1935 |
| JP | 47-7525 | 3/1972 |
| JP | 51-75688 | 6/1976 |
| JP | 52-18485 | 2/1977 |
| JP | 2-198638 | 8/1990 |

OTHER PUBLICATIONS

Bradford et al, "Kinetics of NH3 Decomposition over Well Dispersed Ru", Journal of Catalysis 172, 479–484 (1997).*

Jukka Leppälahti, et al., "Catalytic Conversion of Nitrogen Compounds in Gasification Gas," Fuel Processing Technology, 29, 1991, pp. 43–56.

* cited by examiner

Primary Examiner—Stanley S. Silverman
Assistant Examiner—Maribel Medina
(74) Attorney, Agent, or Firm—Oblon, Spivak, McClelland, Maier & Neustadt, P.C.

(57) ABSTRACT

The present invention provides a method of decomposing an ammonia gas, including the step of decomposing an ammonia gas, into a nitrogen gas with use of a composite material as a catalyst. The composite material has a carrier made mainly of carbon and at least one kind of an active element which is supported by the carrier and selected from alkaline earth metals and transition metals.

14 Claims, 2 Drawing Sheets

METHOD OF DECOMPOSING AMMONIA GAS

CROSS-REFERENCE TO RELATED APPLICATIONS

This application is based upon and claims the benefit of priority from the prior Japanese Patent Application No. 2000-072196, filed Mar. 15, 2000, the entire contents of which are incorporated herein by reference.

BACKGROUND OF THE INVENTION

The present invention relates to a method of decomposing an ammonia gas.

Ammonia generated in the gasification process of coal acts as a poison when the product gas is utilized in the presence of a catalyst, and acts as an $NO_x$ source when the product gas is combusted in a gas turbine. Therefore, removal of ammonia from the product gas is an essential technique for the gasification process of coal.

In general, ammonia is removed from the product gas by decomposing with the aid of a catalyst. As such a catalyst, disposable materials such as dolomite containing iron, sintered iron ore or limestone have been studied. However, such a material has not made it possible to decompose sufficiently the ammonia gas yet.

Such being the situation, it is proposed to use a VIII Group transition metal based catalyst such as Ni or Ru supported by an alumina carrier or the like. The catalyst of this type permits decomposing ammonia with a relatively high efficiency.

However, the VIII Group transition metal based catalyst is costly and, thus, is unsuitable for use in a process of decomposing a large amount of an ammonia gas.

BRIEF SUMMARY OF THE INVENTION

As described above, it was impossible in the past to decompose an ammonia gas with a low cost and with a sufficiently high efficiency.

An object of the present invention is to provide a method of decomposing an ammonia gas with both a low cost and a sufficiently high efficiency.

According to a first aspect of the present invention, there is provided a method of decomposing an ammonia gas into a nitrogen gas with use of a composite material as a catalyst, the catalyst comprising a carrier consisting essentially of carbon and at least one active element supported by the carrier and selected from the group consisting of alkaline earth metals and transition metals.

According to a second aspect of the present invention, there is provided a method of decomposing an ammonia gas into a nitrogen gas with use of a catalyst, the catalyst being at least one of a composite material obtained by heating an organic material containing at least one active element selected from the group consisting of alkaline earth metals and transition metals so as to thermally decompose the organic material, and a composite material obtained by heating a mixture of at least one active element selected from the group consisting of alkaline earth metals and transition metals and an organic material so as to thermally decompose the organic material.

In the present invention, a composite material comprising a carrier consisting essentially of carbon and at least one active element supported by the carrier and selected from alkaline earth metals and transition metals is used as a catalyst for decomposing an ammonia gas. Where the particular composite material is used as a catalyst, it is possible to decompose an ammonia gas into a nitrogen gas with a very high efficiency. In addition, the particular composite material can be manufactured from materials available easily with a low cost. It follows that the present invention permits decomposing an ammonia gas with a low cost and with a sufficiently high efficiency.

In the present invention, it is desirable for the ammonia gas to be decomposed at the temperature of 500 to 1,200° C., preferably 700 to 900° C. Where the decomposition temperature of the ammonia gas is not lower than 500° C., the ammonia gas can be decomposed at a very high degree of decomposition. Also, if the temperature exceeds 1,200° C., a considerably large portion of the ammonia gas is decomposed even if a catalyst is not present. Under the circumstances, the effect of the present invention is rendered more prominent, if the decomposition temperature of the ammonia gas is set at a level not higher than 1,000° C.

It is desirable to decompose the ammonia gas under the pressure of 0.1 to 10 MPa, preferably 0.1 to 2 MPa. Where the ammonia gas is decomposed under the pressure noted above, it is possible to realize a very high degree of decomposition of the ammonia gas.

The composite material used as a catalyst in the present invention can be obtained, for example, by thermally decomposing an organic material containing at least one active element selected from the group consisting of alkaline earth metals and transition metals. Alternatively, the composite material used as a catalyst in the present invention can be obtained by heating a mixture of at least one active element selected from the group consisting of an alkaline earth metals and a transition metals and an organic material so as to thermally decompose the organic material. These methods are simple and the raw materials noted above are very cheap.

The organic material is not particularly limited as far as the organic material produces a carbonaceous material when the organic material is thermally decomposed. For example, the organic material used in the present invention includes coal such as brown coal, subbituminous coal, bituminous coal or anthracite coal, peat coal, algal coal, heavy oil, woody waste such as biomass, waste wood, lumber from thinning, or sawdust, and a plastics waste. Particularly, it is desirable to manufacture the composite material by using a material having a high oxygen content such as brown coal, subbituminous coal, peat coal or algal coal. In the case of using such a material, it is possible to decrease the diameter of the particles formed of the elements noted above to a nanometer order.

The active element supported by a carrier in the present invention is not particularly limited as far as at least one element selected from the group consisting of alkaline earth metals and transition metals is used as an active element supported by the carrier, though it is desirable for iron and/or calcium to be supported by the carrier because of low coast. Where the composite material contains the active element noted above, the ammonia gas can be decomposed with a very high efficiency. The ammonia gas can also be decomposed with a high efficiency in the case where the composite material contains an alkaline earth metal such as magnesium, strontium, or barium or a transition metal such as chromium, manganese, nickel, cobalt, copper, zirconium, molybdenum, palladium, tungsten, rhenium, osmium, iridium, silver, ruthenium, rhodium, gold or platinum.

Where the composite material used as a catalyst in the present invention contains as the active element only one of the alkaline earth metal and the transition metal, it is desirable for the concentration of the active element in the composite material to fall within a range between 0.1 and 10 mass %, more preferably between 1 and 3 mass %. Where the composite material contains as the active elements both the alkaline earth metal and the transition metal, it is desirable for the concentration of the active elements in the composite material to fall within a range between 0.1 and 20 mass %, more preferably between 1 and 5 mass %.

In the present invention, the particle diameter of the composite material is not particularly limited. To be more specific, it is possible for the composite material to be in the form of particles having a diameter of several centimeters or in the form of a powder having a particle diameter of several hundred microns. Further, it is possible to mold the powdery composite material into pellets.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
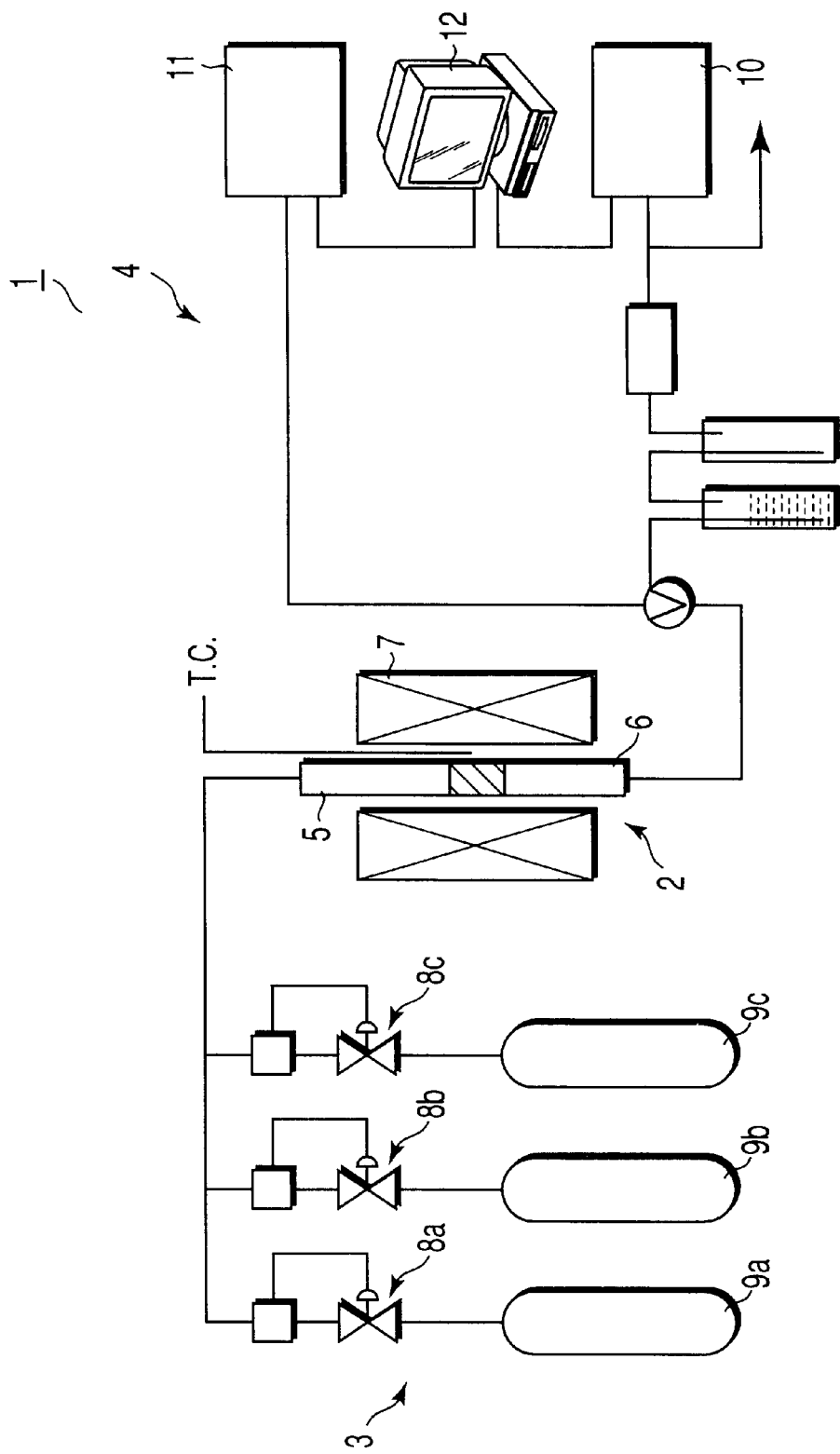
FIG. 1 is a view schematically showing a flow type reaction system employed in the following Examples 1 and 2 of the present invention.

The present invention will now be described in more detail with reference to Examples of the present invention.

EXAMPLE 1

Plural kinds of catalysts were prepared by the methods described below, and the ammonia gas decomposition capability of these catalysts and the change with time in the ammonia gas decomposition capability of these catalysts were examined.

Preparation of Samples (1) to (4)

A solution containing iron ions was added to brown coal produced in Australia, and the resulting mixture was dried under a reduced pressure and at a predetermined temperature. The iron loaded coal was heated to 900° C. under an inert gas atmosphere so as to thermally decompose it, thereby obtaining a composite material of iron and carbon, i.e., sample (1).

Likewise, a solution containing larger amount of iron ions than above was added to brown coal produced in Australia, and the resulting mixture was dried under a reduced pressure and at a predetermined temperature. The solution was added such that the iron concentration in the final composite material should be higher than that of sample (1). The iron-loaded coal was heated to 900° C. under an inert gas atmosphere so as to thermally decompose it, thereby obtaining a composite material consisting of iron and carbon, i.e., sample (2).

Also, a solution containing iron ions was added to a commercially available activated carbon, and the resulting mixture was dried under a reduced pressure and at a predetermined temperature. The iron-loaded carbon was heated to 500° C. under a reducing gas atmosphere, thereby obtaining a composite material consisting of iron and carbon, i.e., sample (3).

Further, a solution containing calcium ions was added to brown coal produced in Australia, and the resulting mixture was dried under a reduced pressure and at a predetermined temperature. The calcium-loaded coal was heated to 800° C. to 900° C. under an inert gas atmosphere so as to thermally decompose it, thereby obtaining a composite material consisting of calcium and carbon, i.e., sample (4).

Analysis of Samples (1) to (4)

The specific surface area, the metal content and the diameter of the metal particle were measured in respect of samples (1) to (4) prepared as above. Table 1 shows the results.

TABLE 1

| Sample | Specific surface area (m$^2$/g) | Metal content (mass %) | Diameter of metal particle (nm) |
|---|---|---|---|
| (1) | 360 | 1.6 | 20–30 |
| (2) | 340 | 5.9 | 30–50 |
| (3) | 610 | 8.3 | 100–500 |
| (4) | 320 | 6.3 | 40–70 |

As shown in Table 1, samples (1), (2) and (4) had a specific surface area of 320 to 360 m$^2$/g, which are substantially equal to each other. In other words, the specific surface area of the composite material is substantially irrelevant to the kind and concentration of the metal. On the other hand, sample (3) had a specific surface area of 610 m$^2$/g, which is about two times as large as the specific surface area for each of samples (1), (2) and (4).

Then, each of samples (1) to (4) was observed with a transmission electron microscope (TEM), with the result that a prominent difference was recognized in the diameter of the metal particles, as apparent from Table 1. To be more specific, the diameter of the metal particles was as large as 100 to 500 nm in sample (3) in contrast to only 20 to 50 nm for each of samples (1) and (2). The diameter of the metal particles was very small in each of samples (1) and (2) because brown coal having a high content of an oxygen-containing functional group was used as the raw material for the composite material.

Measurement of Ammonia Gas Decomposition Capability

The ammonia gas decomposition capability and the change with time in the ammonia gas decomposition capability of samples (1) to (4) prepared as above were examined by using a flow type reaction system shown in FIG. 1.

Specifically, FIG. 1 schematically shows the flow type reaction system 1 used in this example (Example 1). As shown in the drawing, the flow type reaction system 1 is constituted by a reaction section 2 in which the ammonia gas is decomposed, a gas supply/control section 3 for supplying an ammonia-containing gas into the reaction section 2, and a purifying/analyzing section 4 for purifying and analyzing the gas processed in the reaction section 2.

The reaction section 2 has a reaction tube 5 made of quartz and having a catalyst bed 6 arranged therein, a transparent electric furnace 7 made of glass and including a sufficiently long soaking zone arranged to surround the reaction tube 5, and a thermocouple (T.C.) arranged in contact with the outer surface of the reaction tube 5 for controlling the temperature of the catalyst bed 6.

The gas supply/control section 3 has mass flow controllers 8a to 8c connected to the reaction tube 5 and gas supply sources 9a to 9c made of stainless steel and connected to the mass flow controllers 8a to 8c, respectively. Different kinds of gases are housed in the gas supply sources 9a to 9c, and the mass flow controllers 8a to 8c are operated to permit a desired gas to be supplied at a desired flow rate into the reaction tube 5.

The purifying/analyzing section 4 has a high speed gas chromatograph 10, a gas monitor 11, and a computer 12 connected to each of the high speed gas chromatograph 10 and the gas monitor 11. In the purifying/analyzing section 4, the gas discharged from the reaction tube 5 is subjected to an on-line analysis by using the high speed gas chromatograph 10, the gas monitor 11 and the computer 12.

The ammonia gas decomposing capability of samples (1) to (4) was examined by using the flow type reaction system 1. In this experiment, every sample was loaded in the reaction tube 5 to form the catalyst bed 6. An inert gas containing 2,000 ppm of ammonia, or a mixed gas, which contains both a gas whose composition was adjusted to be equal to that of the gas formed by the gasification of coal and an ammonia gas, was used as the ammonia gas. The ammonia gas decomposition treatment was carried out at 750° C., and the ammonia gas was supplied into the reaction tube 5 at a flow rate of 300 $cm^2$ (STP)/min. Further, the pressure within the reaction tube 5 was set at 0.1 MPa. Also, another experiment was carried out under 2 MPa by using the reaction tube 5 made of a metal material.

Figure 2:
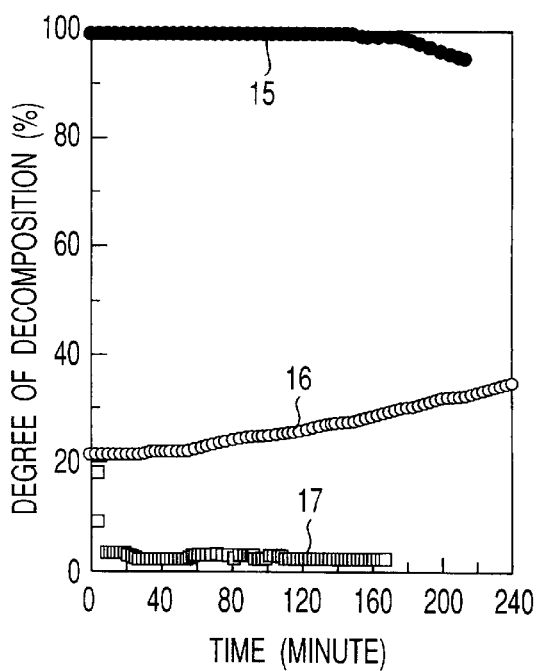
FIG. 2 is a graph showing the relationship between the duration of ammonia gas supply and the degree of ammonia gas decomposition at 750° C. in respect of the ammonia gas decomposition performed in the presence of the composite material according to Example 1 of the present invention.

The ammonia gas was decomposed by the method described above so as to examine the relationship between the duration of ammonia gas supply and the degree of ammonia gas decomposition, covering the case where the catalyst bed 6 was formed of sample (2). Similarly, the relationship between the duration of ammonia gas supply and the degree of ammonia gas decomposition was examined, covering the cases where the catalyst bed 6 was formed of sample (1), where the catalyst bed 6 was formed of sample (3), where the catalyst bed 6 was formed of sample (4), and where the catalyst bed 6 was formed of a quartz wool alone. FIG. 2 shows the results.

Specifically, FIG. 2 is a graph showing the relationship between the duration of ammonia gas supply and the degree of ammonia gas decomposition in respect of the ammonia gas decomposition performed in the presence of the composite material according to the present invention. The duration of ammonia gas supply is plotted on the abscissa of the graph of FIG. 2, with the degree of ammonia gas decomposition being plotted on the ordinate of the graph. Curve 15 in the graph denotes the experimental data in respect of sample (2). Curve 16 in the graph denotes the experimental data in respect of sample (4). Further, curve 17 in the graph denotes the experimental data in respect of the quartz wool alone.

As shown in FIG. 2, the ammonia gas was slightly decomposed in the blank test in which the catalyst bed 6 was formed of the quartz wool alone. However, the degree of decomposition was only several percent. On the other hand, where the catalyst bed 6 was formed of sample (2), the ammonia gas decomposition reaction proceeded rapidly such that the degree of decomposition reached 100% immediately after the ammonia gas was supplied to the catalyst bed. The degree of ammonia gas decomposition in the case where the catalyst bed 6 was formed of sample (4) was lower than that in the case where the catalyst bed 6 was formed of sample (2), but was higher than that in the case where the catalyst bed 6 was formed of the quartz wool alone.

Although not drawn in FIG. 2, where the catalyst bed 6 was formed of sample (3), the degree of ammonia gas decomposition was about 20%, which was certainly higher than that in the case where the catalyst bed 6 was formed of the quarts wool alone, but was only about ⅕ of that in the case where the catalyst bed 6 was formed of sample (2). What should be noted is that samples (2) and (3) widely differ from each other in the diameter of the metal particles, as apparent from Table 1. In other words, the ammonia gas decomposing capability is greatly dependent on the diameter of the metal particles.

Where the catalyst bed 6 was formed of sample (4), the degree of ammonia gas decomposition was higher than that in the case where the catalyst bed 6 was formed of the quartz wool alone, but was lower than that in the case where the catalyst bed 6 was formed of sample (2). However, the degree of ammonia gas decomposition was increased with time in the case of using sample (4), though the degree of ammonia gas decomposition was lowered with time in the case of using sample (2). The experimental data suggest that the ammonia gas can be decomposed with a high efficiency over a long time, if samples (2) and (4) are used in combination.

EXAMPLE 2

Plural kinds of catalysts were prepared by the methods described below in an attempt to look into the relationship between the metal content of the catalyst and the ammonia gas decomposing capability of the catalyst as well as the relationship between the temperature for decomposing the ammonia gas and the ammonia gas decomposing capability of the catalyst.

Preparation of Samples (A) to (C)

A solution containing iron ions was added to brown coal produced in Australia. It is noted that plural kinds of mixtures differing from each other in the iron ion loadings were prepared as the solution. Then, the mixtures were dried under a reduced pressure and at a predetermined temperature, followed by heating the mixtures to 900° C. under an inert gas atmosphere so as to thermally decompose the brown coal, thereby preparing a plural kinds of composite materials containing iron in a concentration of 1.5 to 11 mass %, i.e., sample (A).

Similarly, a solution containing calcium ions was added to brown coal produced in Australia. It is noted that plural mixtures containing a predetermined amount of calcium ions were prepared as the solution. Then, the mixtures were dried under a reduced pressure and at a predetermined temperature, followed by heating the mixtures to 900° C. under an inert gas atmosphere so as to thermally decompose the brown coal, thereby obtaining composite materials containing 6 mass % of calcium, i.e., sample (B).

Further, brown coal produced in Germany and subbituminous coal produced in China each containing inherently both iron and calcium were heated to 900° C. under an inert gas atmosphere so as to thermally decompose these coals, thereby preparing plural kinds of composite materials containing both iron and calcium in different concentrations, i.e., sample (C).

Measurement of Ammonia Gas Decomposition Capability

Figure 3:
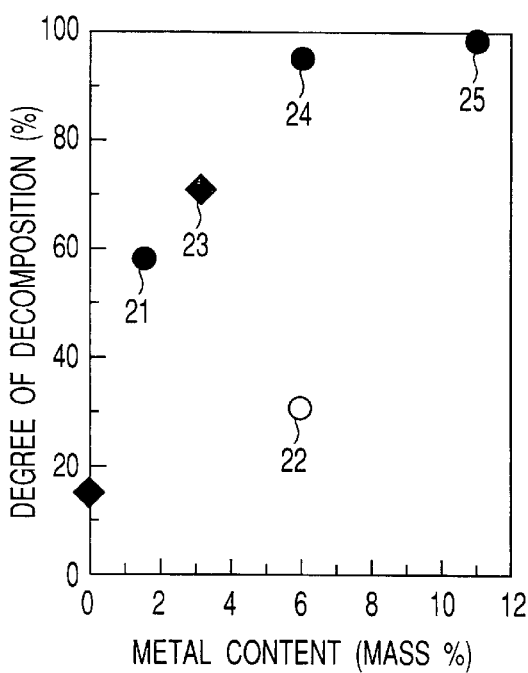
FIG. 3 is a graph showing the relationship between the metal content of the composite material according to Example 2 of the present invention and the degree of ammonia gas decomposition at 750° C.
Figure 4:
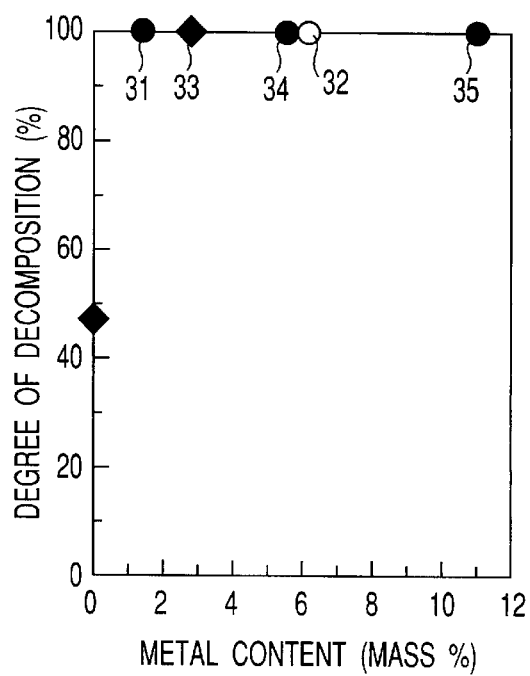
FIG. 4 is a graph showing the relationship between the metal content of the composite material according to Example 2 of the present invention and the degree of ammonia gas decomposition at 850° C.

The ammonia gas decomposition capability of each of samples (A) to (C) prepared by the methods described above was measured by the method described previously in conjunction with Example 1. The decomposition capability was measured in each of the case where the decomposition temperature was set at 750° C. and the case where the decomposition temperature was set at 850° C. FIGS. 3 and 4 show the results.

Specifically, FIG. 3 is a graph showing the relationship between the metal content and the degree of ammonia gas decomposition at 750° C. in respect of the composite material according to Example 2 of the present invention. On the other hand, FIG. 4 is a graph showing the relationship between the metal content and the degree of ammonia gas decomposition at 850° C. in respect of the composite material according to Example 2 of the present invention. In each of the graphs of FIGS. 3 and 4, the metal content of the composite material is plotted on the abscissa, with the degree of ammonia gas decomposition after 160 minutes of decomposition treatment being plotted on the ordinate. Reference numerals 21, 24, 25, 31, 34 and 35 in FIGS. 3 and 4 denote data in respect of sample (A). Reference numerals 22 and 32 in FIGS. 3 and 4 denote data in respect of sample (B). Further, reference numerals 23 and 33 in FIGS. 3 and 4 denote data in respect of sample (C).

As shown in FIG. 3, where the decomposition temperature was set at 750° C., it was possible for sample (A) to achieve a degree of decomposition close to 100% by setting the metal content at about 6 mass % or higher. Also, the relationship between the metal content and the degree of decomposition for sample (C) was substantially equal to that for sample (A). However, in order to allow the degree of decomposition for sample (B) to be substantially equal to that for sample (A), it was necessary to carry out the ammonia gas decomposition at a higher temperature.

On the other hand, where the decomposition temperature was set at 850° C., it was possible to achieve 100% of the degree of decomposition with a relatively low metal content in any of samples (A) to (C). Further, at this decomposition temperature, the activity of the catalyst was not lowered at all, even if the ammonia gas decomposition treatment was continued for about 10 to 15 hours.

Comparison between Samples (A) to (C) and Conventional Catalysts

Table 2 shows the ammonia gas decomposition capability of samples (A) to (C) and the conventional catalysts. The expression "Ru/Al$_2$O$_3$" shown in Table 2 denotes a catalyst having Ru supported by an Al$_2$O$_3$ carrier. Likewise, "Ni/Al$_2$O$_3$" denotes a catalyst having Ni supported by an Al$_2$O$_3$ carrier. The expression "product gas" in Table 2 denotes a gas produced by the gasification process of coal. Further, "pseudo-product gas" denotes an artificially produced gas having a composition substantially equal to that of the product gas.

TABLE 2

| Catalyst | Composition of feed gas | Decomposition treatment temperature (° C.) | Degree of decomposition (%) |
|---|---|---|---|
| Fe-containing dolomite | NH$_3$ + product gas | 900 | 74 |
| Sintered iron ore | NH$_3$ + product gas | 900 | 87 |
| Limestone | NH$_3$ + product gas | 900 | 0 |
| Limestone | NH$_3$ | 850 | 70 |
| Ru/Al$_2$O$_3$ | NH$_3$ | 900 | 86 |
| Ni/Al$_2$O$_3$ | NH$_3$ | 900 | 85 |
| Ni/Al$_2$O$_3$ | NH$_3$ + H$_2$S | 900 | 70 |
| Alloy | NH$_3$ | 700 | 100 |
| Ni-based catalyst | NH$_3$ + pseudo-product gas | 900 | 90 |
| Ni-Zn mixed oxide | NH$_3$ + pseudo-product gas | 700 | 100 |
| Sample (A) | NH$_3$ | 850 | 100 |
| Sample (A) | NH$_3$ + pseudo-product gas | 750 | 100 |
| Sample (B) | NH$_3$ | 850 | 100 |
| Sample (C) | NH$_3$ | 850 | 100 |
| Sample (C) | NH$_3$ + pseudo-product gas | 750 | 100 |

As apparent from Table 2, it was impossible to obtain a sufficiently high degree of decomposition in many of the conventional catalysts. Also, any of the conventional catalysts capable of achieving a sufficiently high degree of decomposition is costly. On the other hand, any of samples (A) to (C) of the present invention permits decomposing the ammonia gas with a sufficiently high degree of decomposition, though these catalysts can be manufactured with a low manufacturing cost and by a simple method. In other words, the experimental data clearly support that samples (A) to (C) are highly effective for decomposing a large amount of an ammonia gas.

As described above, in the present invention, a composite material having a carrier formed essentially of carbon and at least one kind of active element, which is supported by the carrier and selected from alkaline earth metals and transition metals can be used as a catalyst for decomposing an ammonia gas. In the case of using the particular composite material as a catalyst, it is possible to decompose the ammonia gas into a nitrogen gas with a very high efficiency. In addition, the particular composite material can be manufactured with a low manufacturing cost and by a simple method.

Namely, the present invention provides a method of decomposing an ammonia gas, which permits decomposing the ammonia gas with a low cost and at a sufficiently high efficiency.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of decomposing ammonia gas, comprising the step of:

decomposing an ammonia gas into a nitrogen gas with use of a composite material as a catalyst, said catalyst comprising a carrier consisting essentially of carbon and at least one active element supported by said carrier and selected from the group consisting of alkaline earth metals and transition metals, wherein said composite material is at least one of:

a material prepared by heating an organic material containing at least one element selected from the group consisting of alkaline earth metals and transition metals so as to thermally decompose said organic material; and a material prepared by heating a mixture of at least one element selected from the group consisting of alkaline earth metals and transition metals and an organic material so as to thermally decompose said organic material.

2. The method according to claim 1, wherein said ammonia gas is decomposed at a temperature ranging from 500° C. to 1,200° C.

3. The method according to claim 1, wherein said ammonia gas is decomposed under a pressure ranging from 0.1 Mpa to 10 Mpa.

4. The method according to claim 1, wherein said ammonia gas is decomposed at a temperature ranging from 500° C. to 1200° C. and under a pressure ranging from 0.1 MPa to 10 Mpa.

5. The method according to claim 1, wherein said composite material contains an alkaline earth metal.

6. The method according to claim 1, wherein said composite material contains a transition metal.

7. The method according to claim 1, wherein said composite material contains both an alkaline earth metal and a transition metal.

8. A method of decomposing an ammonia gas, comprising the step of decomposing an ammonia gas into a nitrogen gas with use of a catalyst, wherein said catalyst is at least one of:

a composite material obtained by heating an organic material containing at least one element selected from the group consisting of alkaline earth metals and transition metals so as to thermally decompose said organic material, and a composite material obtained by heating a mixture of at least one element selected from the group consisting of alkaline earth metals and transition metals and an organic material so as to thermally decompose said organic material.

9. The method according to claim 8, wherein said ammonia gas is decomposed at a temperature ranging from 500° C. to 1200° C.

10. The method according to claim 8, wherein said ammonia gas is decomposed under a pressure ranging from 0.1 MPa to 10 Mpa.

11. The method according to claim 8, wherein said ammonia gas is decomposed at a temperature ranging from 500° C. to 1200° C. and under a pressure ranging from 0.1 MPa to 10 Mpa.

12. The method according to claim 8, wherein said catalyst contains an alkaline earth element.

13. The method according to claim 8, wherein said catalyst contains a transition metal element.

14. The method according to claim 8, wherein said catalyst contains both an alkaline earth metal element and a transition metal element.

* * * * *